J. S. WINSOR.
Machine for Tapping Nuts.

No. 207,331. Patented Aug. 20, 1878.

WITNESSES.

INVENTOR
Joseph S. Winsor
by Joseph A. Miller

3 Sheets—Sheet 2.

J. S. WINSOR.
Machine for Tapping Nuts.

No. 207,331. Patented Aug. 20, 1878.

WITNESSES
William L. Cox
Joseph A. Miller Jr.

INVENTOR.
Joseph S. Winsor
by Joseph A. Miller
Attorney

3 Sheets—Sheet 3.

J. S. WINSOR.
Machine for Tapping Nuts.

No. 207,331. Patented Aug. 20, 1878.

WITNESSES.
William D. Coof
Joseph A. Miller Jr.

INVENTOR.
Joseph S. Winsor
by Joseph A. Miller
Attorney

UNITED STATES PATENT OFFICE.

JOSEPH S. WINSOR, OF PROVIDENCE, RHODE ISLAND.

IMPROVEMENT IN MACHINES FOR TAPPING NUTS.

Specification forming part of Letters Patent No. 207,331, dated August 20, 1878; application filed January 23, 1878.

*To all whom it may concern:*

Be it known that I, JOSEPH S. WINSOR, of the city and county of Providence, and State of Rhode Island, have invented new and useful Improvements in Nut-Tapping Machines; and I hereby declare that the following is a full, clear, and exact description of the same, reference being had to the accompanying drawings, and to the letters of reference marked thereon, forming part of this specification.

Figure 1:
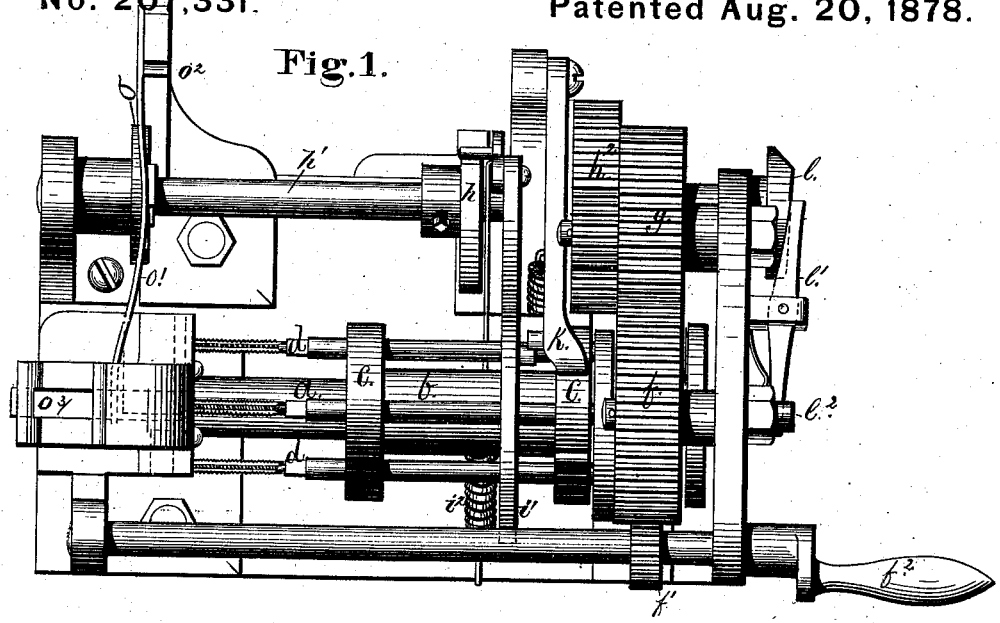
Figure 2:
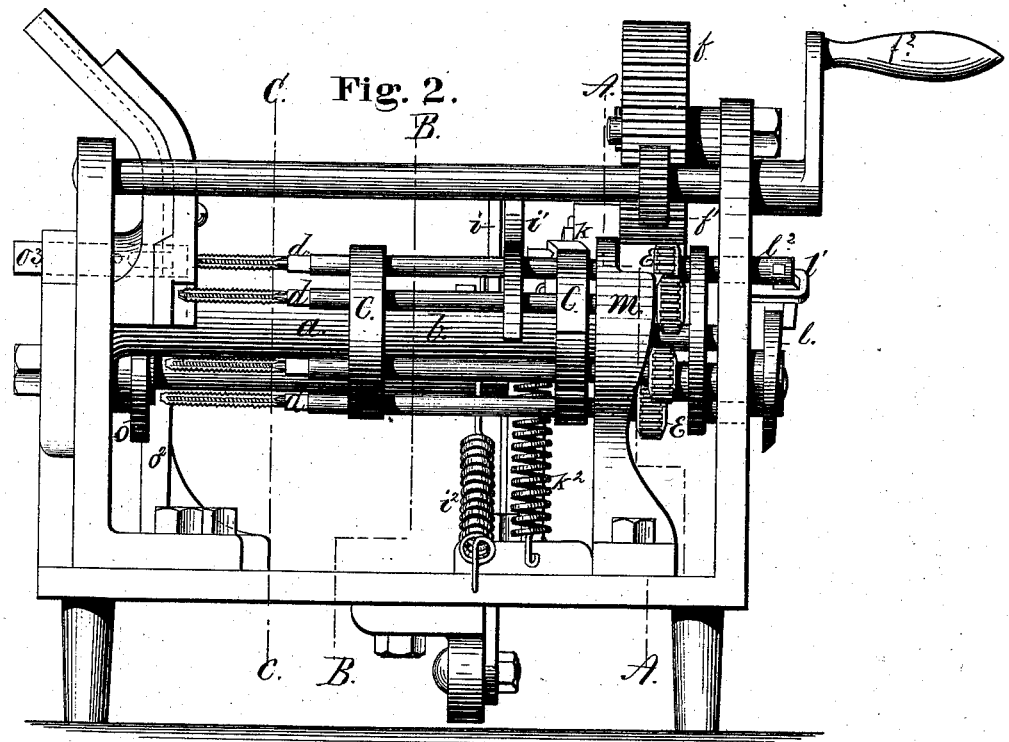
Figure 4:
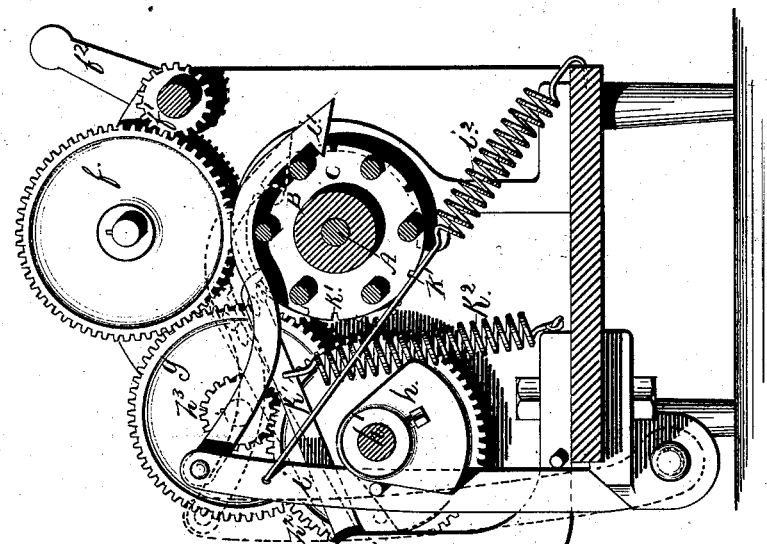
Figure 3:
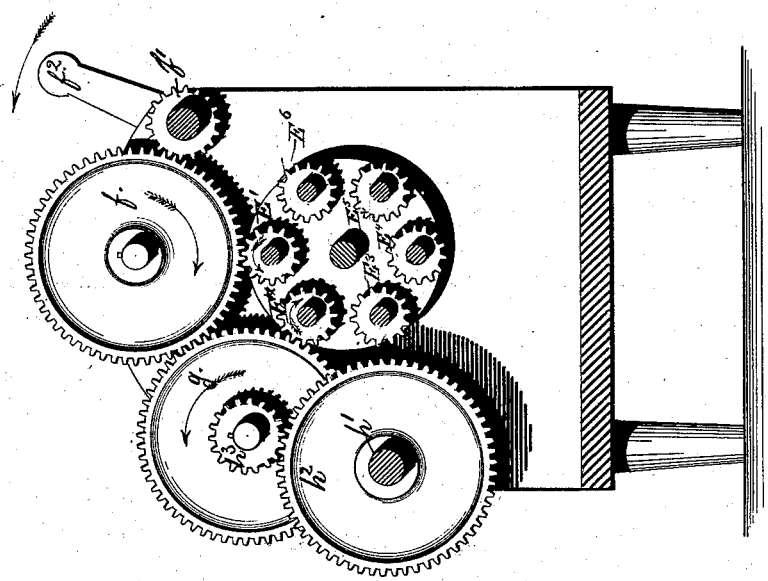
Figure 6:
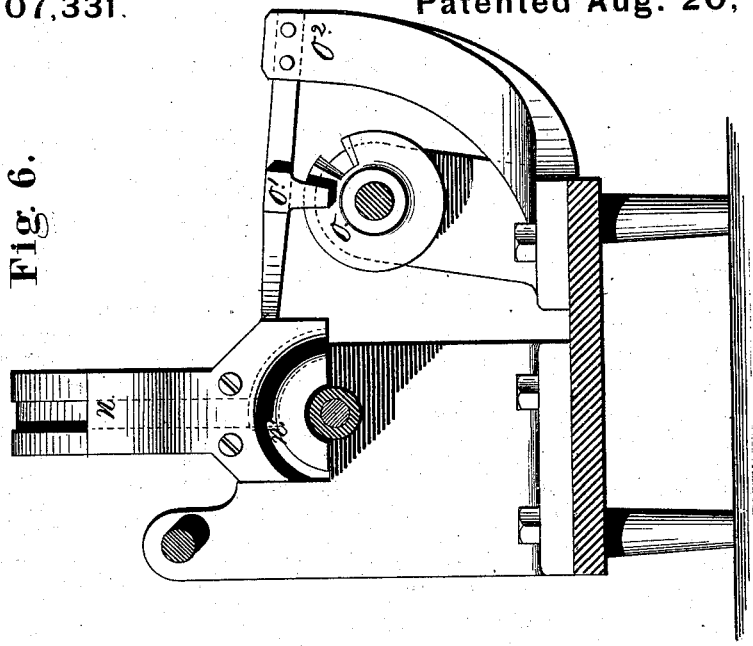
Figure 5:
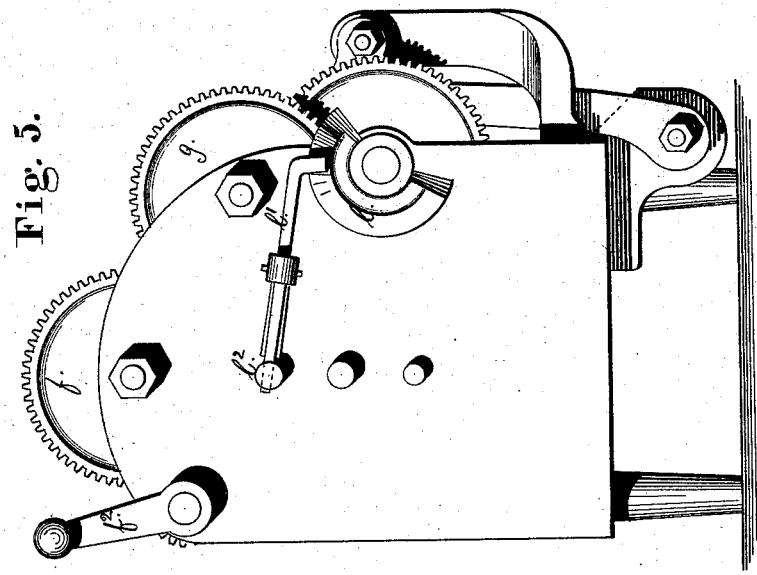

Figure 1 is a top view of my improved nut-tapping machine. Fig. 2 is a side elevation of the same. Fig. 3 is a sectional view through the line A A of Fig. 2. Fig. 4 is a sectional view through the line B B, Fig. 2. Fig. 5 is an end view of the driving end of the machine; and Fig. 6 is a sectional view through the line C C, Fig. 2.

Similar letters of reference indicate corresponding parts.

The object of this invention is to produce a machine for tapping nuts which shall be automatic in its operation, and in which one or more taps are continually cutting the thread into the nuts and one or more taps are unscrewing from the nuts to allow the threaded nuts to be discharged; and my invention consists in the peculiar arrangement of the several parts and the driving mechanism, as will be more fully set forth hereinafter, and pointed out in the claims.

In the drawings, $a$ is a fixed mandrel, on which the sleeve $b$ revolves. C C are heads, secured to the sleeve $b$, and arranged to form bearings for the taps $d\ d$, or the spindles in which the taps are secured.

Each of the spindles and taps in machines for tapping small nuts may be made in one piece, whereas the taps for large nuts would be preferably made separate from the spindles and arranged to be connected or disconnected without disturbing the spindles.

$E^1$, $E^2$, $E^3$, $E^4$, $E^5$, and $E^6$ are gear-wheels secured to the ends of the tap-spindles, and by which the taps are driven, as is clearly shown in Fig. 3, in which $f^2$ is the crank, to the shaft of which the pinion $f^1$ is secured. This pinion gears into the gear-wheel $f$, which, in its turn, gears into the gear-wheel $g$. The small gear $E^1$, secured to the tap-spindle, is therefore driven to the right by the gear $f$, so as to cause the tap to enter the nut-blank, and the pinion $E^2$ to the left, so as to withdraw the tap on its spindle from the threaded nut; and if the gears $f$ and $g$ are continued around the battery of tap-spindles, every alternate tap will be driven to the right to enter the nut-blank and cut the thread, and every other tap to the left to withdraw from the threaded nut, so that any desired number of taps may be arranged to cut the thread into an equal number of nut-blanks and the same number of taps be running in the reverse direction and withdrawing from the threaded nuts.

In the drawing one tap is shown driven so as to cut the thread, and one in the reverse direction to withdraw it from the nut; but it is obvious that by adding four gears like $f$ and $g$ all the taps will be run at the same time.

To automatically deliver the nut-blanks to be threaded to the machine, and to discharge the threaded nuts from the same, the battery of taps, with the sleeve $b$ and heads C C, is revolved the distance of one spindle, so that the place occupied by the gear $E^1$ will next be occupied by $E^6$, and $E^1$ will move to $E^2$, and the nut tapped at $E^1$ will be withdrawn from the tap $d$ and discharged while gear $E^6$ is tapping another nut, (see Fig. 3;) and when the whole battery of taps is geared, as described, the nut-blanks will be delivered to the taps provided with the gears $E^1$, $E^3$, and $E^5$, and the tapped nuts will be discharged from the taps provided with gears $E^2$, $E^4$, and $E^6$. The means by which the turning of the battery is accomplished consist of the cam $h$, secured to a shaft, $h^1$, driven from the pinion $h^3$ through the gear $h^2$, which cam, during its revolution, operates the hinged arm $i$, to the end of which the pawl-lever $i^1$ is hinged, the pawl engaging with one of the tap-spindles. The arm $i$ is kept in contact with the cam $h$ by means of the spring $i^2$.

After the battery of taps is rotated the desired distance the same is locked firmly by means of the lever $k$, which enters one of the slots $k^1$ on the head C, and is held therein by the spring $k^2$. The lever $i^1$ and the lever $k$ are each provided with projecting bosses, arranged so that at the moment the pawl on the lever $i^1$ comes in contact with the tap-spindle the boss on the said lever $i^1$ will have passed under the boss on the lever $k$, and have raised the end out of the slot, and as soon as the rotation of the battery has commenced the bosses will pass one by the other, and the spring $k^2$ will keep the locking-lever in contact with the head C, so that it will enter the next slot.

To insure the clean cutting of the thread in the nut-blank, the cutting-tap is pressed against the blank by the follower $l^2$, operated through the hinged lever $l^1$ by the cam $l$.

In order to adjust the taps in line to enter the nut-holding groove $n'$, the cam M is provided and adapted to engage with the several gears which are respectively formed on the taps or tap-spindles, whereby the latter are brought into proper operative position.

The device for feeding the nut-blanks to the machine is shown in Fig. 6, in which $n$ is a channel connecting with a suitable receptacle and with the circular groove $n'$. Both of these grooves are of such sectional area as will allow a nut of the desired size to freely pass through the same, without, however, allowing the nut to turn around. The spring $o^1$, secured at one end to the arm $o^2$ and at the other end to a reciprocating follower, $o^3$, Figs. 1 and 2, is operated by the cam $o$, so as to force the follower firmly against the nut-blank and hold the same while it is being tapped, and at the proper time release the same. This device may be arranged so as to feed the nut-blanks at more than one point. As soon as the tap is withdrawn the nut will be released and drops from the groove $n'$.

In tapping nuts the speed of the tap is limited to the point at which the tap will heat sufficiently to injure its temper. By my improved machine (without increasing the speed of the taps) the production is largely increased.

Having thus described my invention, I claim as new and desire to secure by Letters Patent—

1. In a nut-tapping machine, the annular series of taps or tap-spindles, each of which latter is loosely supported in intermittingly-revolving heads or disks, and is adapted by connecting mechanism to tap a nut and then automatically withdraw the tap from said nut, substantially as set forth.

2. The combination, with an annular battery of taps or tap-spindles, which latter are loosely supported in intermittingly-revolving heads or disks, and respectively adapted to tap a nut and automatically withdraw the tap from each tapped nut, of mechanism for adjusting said taps in line to re-enter the nut-holding groove, substantially as set forth.

3. The combination, with an annular battery of taps or tap-spindles, which latter are loosely supported in intermittingly-revolving heads or disks, the same being adapted to tap a nut and automatically withdraw the tap from such tapped nut, of mechanism whereby each cutting-tap is respectively pressed against the nut, substantially as set forth.

4. The combination, with an annular battery of taps or tap-spindles, which latter are loosely supported in intermittingly-revolving heads or disks, and adapted by connecting means to simultaneously tap a nut with one tap and automatically withdraw another one of its taps from a tapped nut, of respective mechanism, as described, for pressing the cutting-tap against its nut, and for adjusting each tap, after it is withdrawn from the nut, so that it may be in line to re-enter the nut-holding groove, substantially as set forth.

5. The combination, with the intermittingly-revolving annular battery of taps or tap-spindles, which latter are loosely supported in suitable bearing-heads, of the spring-retracted follower, which bears against each cutting-tap as the same comes in line therewith, substantially as set forth.

6. In a nut-tapping machine, the combination, with the intermittingly-revolving annular battery of taps or tap-spindles, each of which latter is adapted by the described connecting mechanism to have rotation in opposite directions, as required, to thread into and unthread from the nut, of the stationary cam, which, by engagement with the gears respectively formed on the driven ends of said taps or tap-spindles, adjusts the taps in line to enter the nut-holding groove, substantially as set forth.

7. In a nut-tapping machine, the combination, with the intermittingly-revolving annular battery of taps or tap-spindles, each of which is loosely supported in suitable bearing-heads and formed with gear-pinions on their driven ends, of the system of gear-wheels, which revolve in opposite directions and respectively engage with said pinion-gears as the battery has intermittent revolution about its longitudinal axis, substantially as set forth.

8. The combination, with the intermittingly-revolving battery of taps, of the nut-feeding device, provided with channel $n$, which connects with a suitable receptacle, and the circular groove $n'$, both said channel and groove being adapted by their sectional area to prevent the nuts from turning during their passage through the same, substantially as set forth.

9. In a nut-tapping machine, the combination, with the automatic feeding device, of the nut-holding device, the latter consisting of the reciprocating follower, the horizontal spring-bar connecting therewith, and the cam, which latter is formed, as shown, to give the required movement to said follower by engagement of the spring-bar therewith, substantially as set forth.

10. In a nut-tapping machine, an annular series of taps, adapted by automatic mechanism to have intermittent axial revolution to tap a nut and to withdraw the tap therefrom, in combination with an automatic nut-feeding device, which latter is provided with a nut-holding groove, in which all the cutting-taps respectively work, substantially as set forth.

JOSEPH S. WINSOR.

Witnesses:
JOSEPH A. MILLER,
A. A. WHITE.